(12) United States Patent
Thakore et al.

(10) Patent No.: US 12,443,697 B1
(45) Date of Patent: Oct. 14, 2025

(54) SYSTEMS AND METHODS FOR SUPPORTING A PLURALITY OF PASSWORDS IN A COMMUNICATION NETWORK

(71) Applicant: Cable Television Laboratories, Inc., Louisville, CO (US)

(72) Inventors: Darshak Thakore, Broomfield, CO (US); John C. Bahr, Superior, CO (US); Craig M. Pratt, Portland, OR (US); Carey Sonsino, Golden, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 493 days.

(21) Appl. No.: 17/660,615

(22) Filed: Apr. 25, 2022

Related U.S. Application Data

(60) Provisional application No. 63/326,665, filed on Apr. 1, 2022, provisional application No. 63/179,026, filed on Apr. 23, 2021.

(51) Int. Cl.
  *G06F 21/45* (2013.01)
  *H04W 12/06* (2021.01)

(52) U.S. Cl.
  CPC .......... *G06F 21/45* (2013.01); *H04W 12/068* (2021.01)

(58) Field of Classification Search
  CPC .................................................. G06F 21/45
  See application file for complete search history.

(56) References Cited

U.S. PATENT DOCUMENTS

| | | | |
|---|---|---|---|
| 6,996,714 B1* | 2/2006 | Halasz | H04L 9/3273 713/168 |
| 7,484,008 B1 | 1/2009 | Gelvin et al. | |
| 9,027,138 B2 | 5/2015 | Glenn et al. | |
| 9,215,075 B1 | 12/2015 | Poltorak | |
| 9,342,661 B2 | 5/2016 | Cholas et al. | |

(Continued)

FOREIGN PATENT DOCUMENTS

WO 2018015425 A1 1/2018

OTHER PUBLICATIONS

Lamb et al., IEEE 2014, 6th International workshop, "Towards Robust Trust in Software Defined Networks," pp. 166-171 (Year: 2014).

(Continued)

*Primary Examiner* — Ponnoreay Pich
(74) *Attorney, Agent, or Firm* — PdZ Patent Law, PLLC

(57) ABSTRACT

A method for supporting a plurality of passwords in a communication network includes (a) receiving a client authentication message generated by a network client wishing to connect to the communication network, (b) computing a respective password authentication message for at least one password of a plurality of passwords stored in a password database to generate a set of one or more password authentication messages, each password of the plurality of passwords being a password for the communication network, (c) identifying a password authentication message of the set of one or more password authentication messages that matches the client authentication message, and (d) associating, with the network client, metadata corresponding to a password of the password database used to compute the password authentication message that matches the client authentication message.

20 Claims, 5 Drawing Sheets

(56) References Cited

U.S. PATENT DOCUMENTS

| | | | |
|---|---|---|---|
| 9,419,842 B1 | 8/2016 | Galliher, III et al. | |
| 9,531,835 B2 | 12/2016 | Wynn et al. | |
| 9,686,199 B2 | 6/2017 | Anand | |
| 10,404,752 B2 | 9/2019 | Apsangi et al. | |
| 10,749,796 B2 | 8/2020 | Dowlatkhah et al. | |
| 11,244,561 B1 | 2/2022 | Fuchs et al. | |
| 11,284,258 B1 | 3/2022 | Wei et al. | |
| 11,533,341 B2 | 12/2022 | Sood et al. | |
| 11,671,829 B1 | 6/2023 | Radhakrishnan et al. | |
| 11,683,687 B2 | 6/2023 | Myers et al. | |
| 11,689,524 B2 | 6/2023 | Arora et al. | |
| 11,693,946 B2 | 7/2023 | Bradley et al. | |
| 11,777,917 B2 | 10/2023 | Erickson et al. | |
| 2003/0126233 A1 | 7/2003 | Bryers et al. | |
| 2004/0019786 A1* | 1/2004 | Zorn | H04L 63/061 713/168 |
| 2007/0234419 A1 | 10/2007 | Shouno | |
| 2008/0229399 A1 | 9/2008 | O'Neil et al. | |
| 2010/0100930 A1 | 4/2010 | King | |
| 2010/0235514 A1 | 9/2010 | Beachem | |
| 2010/0262988 A1 | 10/2010 | Bauer et al. | |
| 2011/0143757 A1 | 6/2011 | Oh et al. | |
| 2011/0196837 A1 | 8/2011 | Savunen et al. | |
| 2011/0216709 A1 | 9/2011 | Noldus | |
| 2011/0302248 A1 | 12/2011 | Garrett et al. | |
| 2012/0173356 A1 | 7/2012 | Fan et al. | |
| 2012/0174212 A1 | 7/2012 | Dart et al. | |
| 2012/0210001 A1 | 8/2012 | Ryerson et al. | |
| 2012/0297470 A1 | 11/2012 | Kwon | |
| 2013/0111550 A1 | 5/2013 | Naveh et al. | |
| 2013/0268999 A1 | 10/2013 | Kiang et al. | |
| 2014/0068261 A1 | 3/2014 | Malek et al. | |
| 2014/0123211 A1 | 5/2014 | Wanser et al. | |
| 2014/0162629 A1 | 6/2014 | Tipton et al. | |
| 2014/0281029 A1 | 9/2014 | Danforth | |
| 2014/0283120 A1 | 9/2014 | Mao et al. | |
| 2014/0289515 A1 | 9/2014 | Sorotokin et al. | |
| 2015/0140957 A1 | 5/2015 | Kiswani et al. | |
| 2015/0148020 A1 | 5/2015 | Laden et al. | |
| 2015/0347769 A1 | 12/2015 | Espinosa et al. | |
| 2016/0134488 A1 | 5/2016 | Straub et al. | |
| 2016/0192184 A1 | 6/2016 | Salihi | |
| 2016/0203352 A1 | 7/2016 | Marsico | |
| 2016/0234213 A1 | 8/2016 | Kim et al. | |
| 2016/0350095 A1 | 12/2016 | Ramachandran et al. | |
| 2016/0373319 A1 | 12/2016 | Littlejohn et al. | |
| 2017/0048700 A1 | 2/2017 | Huang et al. | |
| 2017/0150362 A1 | 5/2017 | Clemenson et al. | |
| 2017/0308395 A1 | 10/2017 | Cook et al. | |
| 2017/0311368 A1 | 10/2017 | Kandur Raja et al. | |
| 2018/0024537 A1 | 1/2018 | Chauvet et al. | |
| 2018/0034817 A1 | 2/2018 | Milton et al. | |
| 2018/0123932 A1 | 5/2018 | Shaw et al. | |
| 2018/0302408 A1 | 10/2018 | Touati et al. | |
| 2018/0316730 A1 | 11/2018 | Schaefer et al. | |
| 2019/0021125 A1 | 1/2019 | Bischinger | |
| 2019/0149987 A1 | 5/2019 | Moore | |
| 2019/0182663 A1 | 6/2019 | Wang | |
| 2019/0268762 A1 | 8/2019 | Bestermann et al. | |
| 2020/0045519 A1 | 2/2020 | Raleigh et al. | |
| 2020/0394332 A1 | 12/2020 | Jakobsson et al. | |
| 2021/0076216 A1 | 3/2021 | Hotchkiss et al. | |
| 2021/0144517 A1 | 5/2021 | Bernat et al. | |
| 2023/0025898 A1 | 1/2023 | Kaplan et al. | |
| 2023/0141055 A1 | 5/2023 | Kim et al. | |

OTHER PUBLICATIONS

Boussard et al., 2015 IEEE, 27th International Teletraffic Congress, "Software-Defined LANs for Interconnected Smart Environments", pp. 219-227 (Year: 2015).

U.S. Appl. No. 17/592,356, filed Feb. 3, 2022, Brian Alexander Scriber.

U.S. Appl. No. 18/130,377, Apr. 3, 2023, John C. Bahr.

U.S. Appl. No. 18/449,619, Aug. 14, 2023, Craig Pratt.

Ahearne et al., "Software Defined Control of Tunable Optical Transceivers using NETCONF and YANG", 2018 European Conference on Networks and Communications (EuCNC): Network Softwarisation (NET) pp. 81-86 (Year: 2018).

Behrad et al., 2019 IEEE, 22nd Conference on Innovation in Clouds, Internet and Networks, "Network Access Control for the IoT: A Comparison Between Cellular, Wi-Fi and LoRaWAN," pp. 195-200 (Year: 2019).

Bifulco et al., "A practical experience in designing an OpenFlow controller", 2012 European Workshop on Software Defined Networking, pp. 61-66 (Year: 2012).

Karmakar et al., "On the Design and Implementation of a Security Architecture for End to End Services in Software Defined Networks," 2016 IEEE 41st Conference on Local Computer Networks, pp. 519-522 (Year: 2016).

Lampropoulos et al., 2011 IEEE, "Identity Management Directions in Future Internet," pp. 74-83 (Year: 2011).

Li et al., 2015 IEEE, "Software-Defined Network Function Virtualization: A survey," pp. 2542-2553 (Year: 2015).

Medved et al., "OpenDaylight: Towards a Model-Driven SDN Controller Architecture", IEEE Conferences [ Jun. 1, 2014] Proceeding of IEEE International Symposium on a World of Wireless, Mobile and Multimedia Networks 2014 (pp. 1-6) (Year: 2014).

Namal et al., IEEE 2014 Eighth International Conference on Next Generation Mobile Applications, Services and Technologies, SDN Core for Mobility Between Cognitive Radio and 802.11 Networks, pp. 272-281 (Year: 2014).

Nguyen et al., "Software-defined model for IoT clusters: enabling applications on demand", 2018 IEEE, pp. 776-781 (Year: 2018).

Taha Ali et al., 2015 IEEE, Transactions of Reliability, "A Survey of Securing Networks Using Software Defined Networking," pp. 1086-1097 (Year: 2015).

* cited by examiner

SYSTEMS AND METHODS FOR SUPPORTING A PLURALITY OF PASSWORDS IN A COMMUNICATION NETWORK

CROSS REFERENCE TO RELATED APPLICATIONS

This application claims the benefit of priority to each of (1) U.S. Provisional Patent Application Ser. No. 63/179,026, filed on Apr. 23, 2021, and (2) U.S. Provisional Patent Application Ser. No. 63/326,665, filed on Apr. 1, 2022. Each of the aforementioned patent applications is incorporated herein by reference.

BACKGROUND

Passwords are commonly used to restrict access to communication networks. For example, most Wi-Fi wireless communication networks require a user to provide a password as a condition for accessing the network. All users of a residential or small business Wi-Fi wireless communication network typically share a single password for accessing the network.

DETAILED DESCRIPTION OF THE EMBODIMENTS

Figure 1:
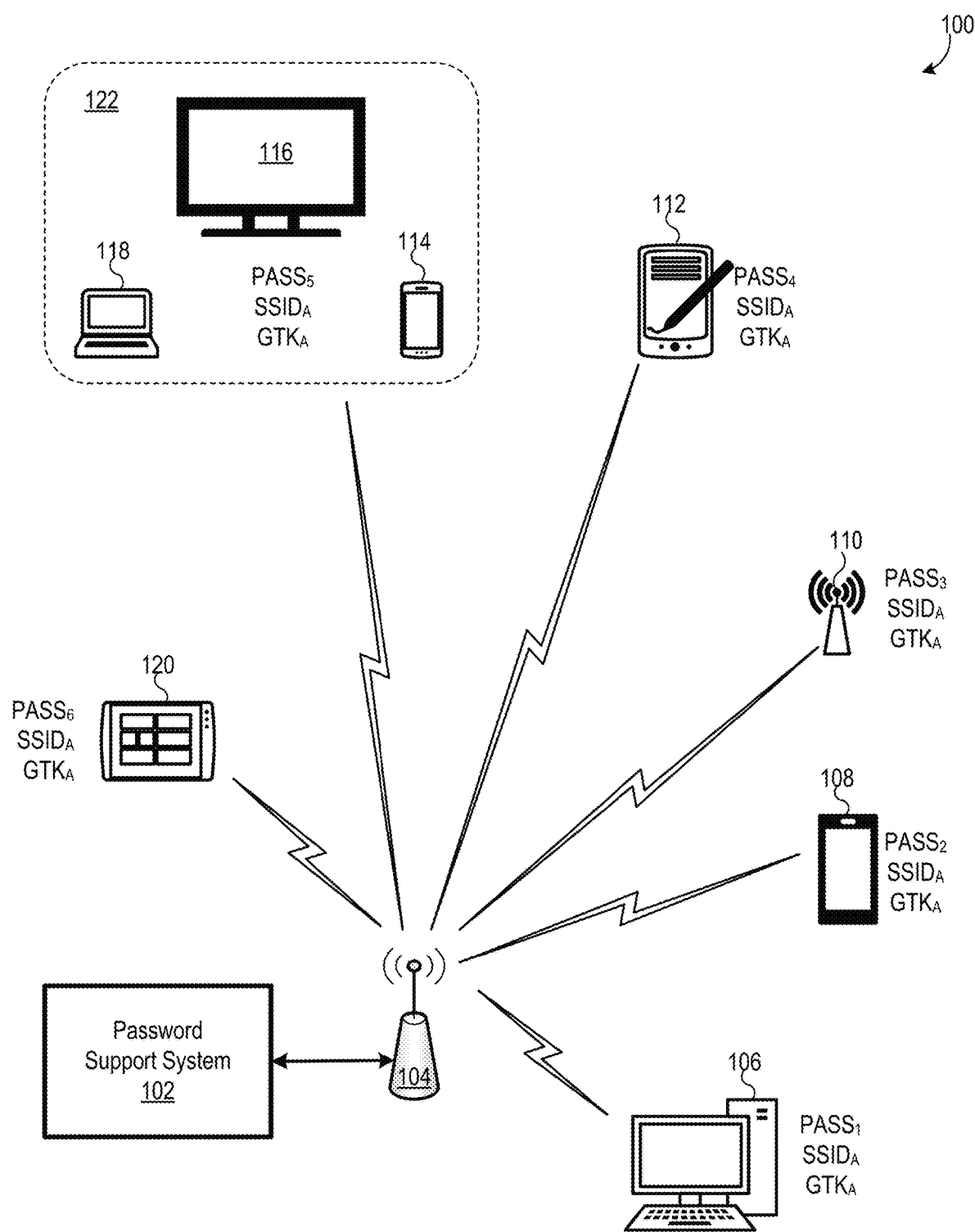
FIG. 1 is a block diagram of a wireless communication system including a password support system, according to an embodiment.

Once a password is shared, it cannot be unshared. Consequently, the only sure way to revoke access to a Wi-Fi wireless communication network for a particular user or device is to change the password for the network, which inconveniences all user of the network by requiring all users (and devices) to use a new password. Changing a password in a Wi-Fi wireless communication network may be particularly inconvenient if the network includes one or more Internet of Things (IoT) devices because an IoT device typically has a limited user interface, or no user interface, for password entry. While media access control (MAC) address filtering can sometimes be used to block access to a Wi-Fi wireless communication network on a per-device basis, MAC address filtering will not work with devices employing random or changing MAC addresses. Additionally, a user can potentially subvert MAC address filtering by changing a MAC address of a device to an address that is not blocked, or by changing the MAC address of the device to an address that is on a "white list" of authorized of MAC addresses. Moreover, MAC address filtering can only control access to a Wi-Fi wireless communication network on a per-device basis. As such, MAC address filtering cannot directly control access to a Wi-Fi wireless communication on a per-user basis.

The aforementioned problems can be resolved by assigning a different respective password to each user, or to each device, of a Wi-Fi wireless communication network. While some enterprise-grade security protocols allow a different password to be assigned to each user or device, security protocols typically used in residential and small business Wi-Fi wireless communication networks do not support multiple passwords. For example, the Wi-Fi Protected Access II (WPA2) security protocol, which is commonly used in residential and small business Wi-Fi wireless communication networks, is normally implemented such that all users and devices of a given Wi-Fi wireless communication network share a common password. Accordingly, it is not practical to assign a different respective password to each user or device in a residential or small business Wi-Fi wireless communication network using conventional technology.

Disclosed herein are systems and methods for supporting a plurality of passwords in a communication network which at least partially overcome the aforementioned drawbacks of conventional security protocols. Certain embodiments of the new systems and methods advantageously enable passwords to be assigned on a per-user basis, on a per-device basis, and/or on a per-policy basis. Such ability to assign passwords on a per-user, per-device, and/or per-policy basis may achieve significant advantages. For example, in some embodiments, access to a communication network can be revoked for a given device or user without requiring other users and devices to use a new password. Access can advantageously be revoked for the device even if the device uses a random or changing MAC addresses and even if a user changes a MAC address of the device. As another example, in certain embodiments, communication network parameters, such as quality of service (QOS), bandwidth, access restrictions, etc., can be assigned on a per-user basis and/or per-device basis, thereby enabling network parameter customization for one or more users and/or devices of the communication network. Furthermore, particular embodiments may be used with conventional network clients, such as with conventional Wi-Fi stations, without requiring changes to the network clients. Moreover, some embodiments are compatible with security protocols commonly used in residential and small business applications, such as the WPA2 security protocol.

The new systems and methods are discussed below primarily with respect to Wi-Fi wireless communication networks. However, the new systems and methods are not limited to Wi-Fi wireless communication networks. For example, certain embodiments of the new systems and methods could be implemented in other types of wireless communication networks, including but not limited to cellular wireless communication networks (e.g., 3$^{rd}$ Generation Partnership (3GPP) wireless communication networks), satellite wireless communication networks (e.g., very low earth orbit (VLEO) satellite wireless communication networks, low earth orbit (LEO) satellite wireless communication networks, medium earth orbit (MEO) satellite wireless communication networks, or geostationary equatorial orbit (GEO) satellite wireless communication networks), Bluetooth wireless communication networks, long range (LoRa) wireless communication networks, or Zigbee wireless communication networks. As another example, the new systems and methods could be implemented in wireline communication networks, including but not limited to optical wireline communication networks or electrical wireline communication networks (e.g., cable wireline communication networks, Ethernet wireline communication networks, digital subscriber line (DSL) wireline communication networks, home networking wireline communication networks, or power line communication networks). Furthermore, the new systems and methods could be implemented in hybrid communication networks, such as hybrid wireline and wireless communication networks. In this document, a Wi-Fi wireless communication network is a wireless communication network configured to operate at least partially according to an Institute of Electrical and Electronics Engineers (IEEE) 802.11-based standard, as well as extensions, modifications, and/or successors of IEEE 802.11-based standards.

FIG. 1 is a block diagram of a wireless communication network 100 including a password support system 102, a wireless access point (AP) 104, and network clients 106-120. In the FIG. 1 embodiment, network client 106 is a desktop computer, network client 108 is a mobile telephone, network client 110 is either another wireless access point (e.g., a Wi-Fi wireless access point) or a wireless extender (e.g., a Wi-Fi wireless extender), network client 112 is a personal digital assistant, network client 114 is a mobile telephone, network client 116 is a television, network client 118 is a notebook computer, and network client 120 is a tablet computer. However, the number of network clients in wireless communication network 100, as well as the types of network clients in wireless communication network 100, may vary. Additionally, wireless communication network 100 may include additional wireless access points communicatively coupled to password support system 102.

Wireless access point 104 is configured to exchange data with network clients 106-120 via wireless communication signals, which are symbolically shown in FIG. 1 by lightning bolts. In some embodiments, wireless access points 104 and network clients 106-120 exchange data according to a Wi-Fi wireless communication standard. For example, some embodiments of wireless access points 104 and network clients 106-120 exchange data according to one or more of the following Wi-Fi standards: an IEEE 802.11n standard, an IEEE 802.11ac standard, an IEEE 802.11ax standard, an IEEE 802.11be standard, extensions of any of the foregoing IEEE standards, variations of any of the foregoing IEEE standards, and successors to any of the foregoing IEEE standards. Some embodiments of wireless access point 104 are configured to use a pre-shared key (PSK) client authentication method. Additionally, certain embodiments of wireless access point 104 are at least partially supported using a hostapd daemon.

Password support system 102 is one embodiment of the new systems for supporting a plurality of passwords. While password support system 102 is illustrated in FIG. 1 as being a standalone system that is in communication with wireless access point 104, password support system 102 could be partially or fully integrated with wireless access point 104. For example, certain embodiments of password support system 102 share hardware, firmware, and/or software with wireless access point 104. Alternately, password support system 102 may be completely separate from wireless access point 104, as long as password support system 102 is in communication with wireless access point 104. For example, password support system 102 could be at least partially implemented within a network controller (not shown), such as in a local network controller in the vicinity of wireless access point 104, or in a remote network controller distant from wireless access point 104. Furthermore, while password support system 102 is illustrated as being a single element, password support system 102 could include multiple sub-elements that need not be commonly located and need not be hosted by common hardware and/or software. For example, particular embodiments of password support system 102 are at least partially implemented by a distributed computing system, such as a cloud computing system.

Wireless communication network 100 is configured to support a plurality of passwords. For example, FIG. 1 illustrates each of network clients 106, 108, 110, 112, and 120 being assigned different respective passwords $PASS_1$, $PASS_2$, $PASS_3$, $PASS_4$, and $PASS_6$. Passwords $PASS_1$, $PASS_2$, $PASS_3$, $PASS_4$, and $PASS_6$ could be associated with respective MAC addresses of network clients, or the passwords could be associated with respective users of the network clients. Additionally, two or more devices and/or users could be assigned a common password, such as a password associated with a particular network operation policy, a password associated with a particular type of client, a password associated with a particular service level, a password associated with a particular user or organization, etc. For example, FIG. 1 illustrates each of network clients 114, 116, and 118 of a group 122 being assigned a common password $PASS_5$. Network clients 114, 116, and 118 of group 122 are, for example, associated with a common user or organization, a common network operation policy, or a common service level.

Passwords of wireless communication network 100 may be generally referred to as $PASS_N$, where N is a subscript ranging from one to the six. The range of N will vary according to the number of passwords supported by wireless communication network 100. For example, N would range from one to seven if wireless communication network 100 supported seven passwords instead of six passwords, and N would range from one to five if wireless communication network 100 supported five passwords instead of six passwords.

Importantly, wireless communication network 100 supports use of multiple passwords even though other parameters of the network, such as a Service Set Identifier (SSID) and/or a Group Temporal Key (GTK), may be uniform across all network clients. For example, FIG. 1 illustrates all network clients 106-120 sharing a common $SSID_A$ and a common $GTK_A$ even though passwords may vary among the network clients.

Each password $PASS_N$ of wireless communication network 100 may be associated with respective metadata $MD_N$ that may be used by wireless access point 104 to customize an operating experience for one or more network clients associated with the password. Examples of possible metadata $MD_N$ associated with a password $PASS_N$ include, but are not limited, one or more of the following: (a) allocated communication bandwidth, (b) supported communication protocols, (c) temporal use limitations, (d) communication end point limitations, (e) network client limitations, (f) type of communication service, (g) network client and/or user priority, (h) security policy, (i) restrictions on communication with other network clients, and (j) wireless communication radio frequency (RF) band restrictions.

As one example of how wireless access point 104 could customize network client operating experience according to metadata associated with passwords, consider an example where (a) metadata $MD_1$ associated with password $PASS_1$ specifies an allocated bandwidth of 1 Gigabit per second (Gbps) and (b) metadata $MD_2$ associated with password $PASS_2$ specifies an allocated bandwidth of 100 Megabits per second (Mbps). Wireless access point 104 may allocate 1 Gbps of bandwidth to network client 106, and wireless access point 104 may allocate 100 Mbps of bandwidth to network client 108, in accordance with metadata $MD_1$ and $MD_2$, respectively.

As another example of how wireless access point 104 could customize network client operating experience according to metadata associated with passwords, consider an example where (a) metadata $MD_3$ associated with password $PASS_3$ does not include temporal use restrictions and (b) metadata $MD_6$ associated with password $PASS_6$ specifies that network client 120 may not be used between 10:00 PM and 6:00 AM. Wireless access point 104 may allow network client 110 to access wireless communication network 100 at any time, and wireless access point 104 may prohibit network client 120 from accessing wireless communication network 100 between 10:00 PM and 6:00 AM, in accordance with metadata $MD_3$ and $MD_6$, respectively.

Password support system 102 enables wireless communication network 100 to support a plurality of passwords by authenticating passwords provided by network clients 106-120 to wireless access point 104. Additionally, some embodiments of password support system 102 provide respective metadata $MD_N$ associated with a password $PASS_N$ to wireless access point 104 and/or other elements of wireless communication network 100, such as to enable wireless communication network 100 to provide a custom operating experience for one or more network clients 106-120.

Figure 2:
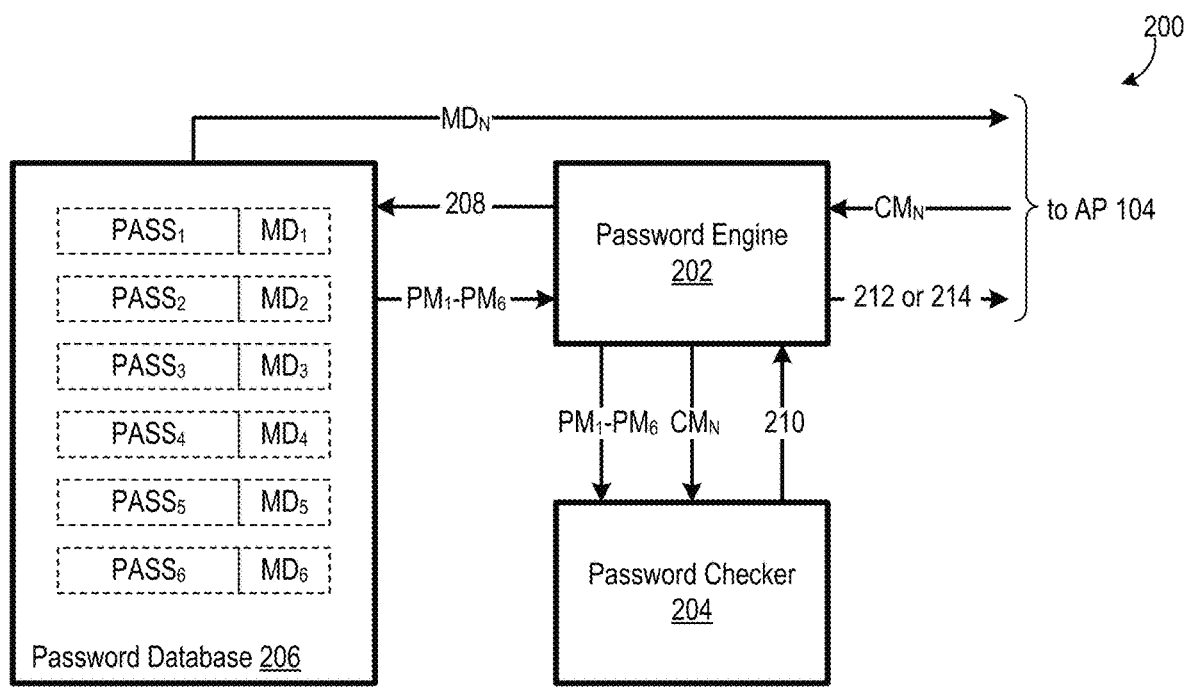
FIG. 2 is a block diagram of one embodiment of the password support system of FIG. 1.

FIG. 2 is a block diagram of a password support system 200, which is one possible embodiment of password support system 102 of FIG. 1. Password support system 200 includes a password engine 202, a password checker 204, and a password database 206. Password engine 202, password checker 204, and password database 206 are implemented, for example, by one or more processors (not shown) and one or more data stores (not shown), where the one or more processors are configured to execute instructions stored in the one or more data stores, such as instructions in the form of software and/or firmware, to perform the functions of password support system 200. However, one or more of password engine 202, password checker 204, and password database 206 could be implemented in other manners. Additionally, while FIG. 2 depicts password engine 202, password checker 204, and password database 206 as being separate elements, two or more of these elements may be partially or fully combined without departing from the scope hereof.

Password engine 202 is configured to logically interface password support system 200 with wireless access point 104 (and optionally additional wireless access points of wireless communication network 100), as well as interface password database 206 with password checker 204. Password database 206 is configured to store each valid password of wireless communication network 100, i.e., passwords $PASS_1$ through $PASS_6$. It should be appreciated that the fact that password database 206 stores valid passwords of wireless communication network 100, instead of other information that may not correspond to passwords of wireless communication network 100, facilitates quick authentication of network clients 106-120. In some embodiments, password database 206 solely stores valid passwords of wireless communication network 100. Password database 206 optionally further stores respective metadata $MD_N$ associated with each password of wireless communication network 100. For example, FIG. 2 depicts password database 206 storing metadata $MD_1$ associated with password $PASS_1$, metadata $MD_2$ associated with password $PASS_2$, metadata $MD_3$ associated with password $PASS_3$, and so on.

Password checker 204 is configured to determine if a password provided by a network client wishing to connect to wireless communication network 100 matches one of the passwords stored in password database 206. Password engine 202 notifies wireless access point 104 that authentication succeeded if the password provided by the network client matches one of the passwords stored in password database 206. Conversely, password engine 202 notifies wireless access point 104 that authentication failed if the password provided by the network client does not match any of the passwords stored in password database 206.

Figure 3:
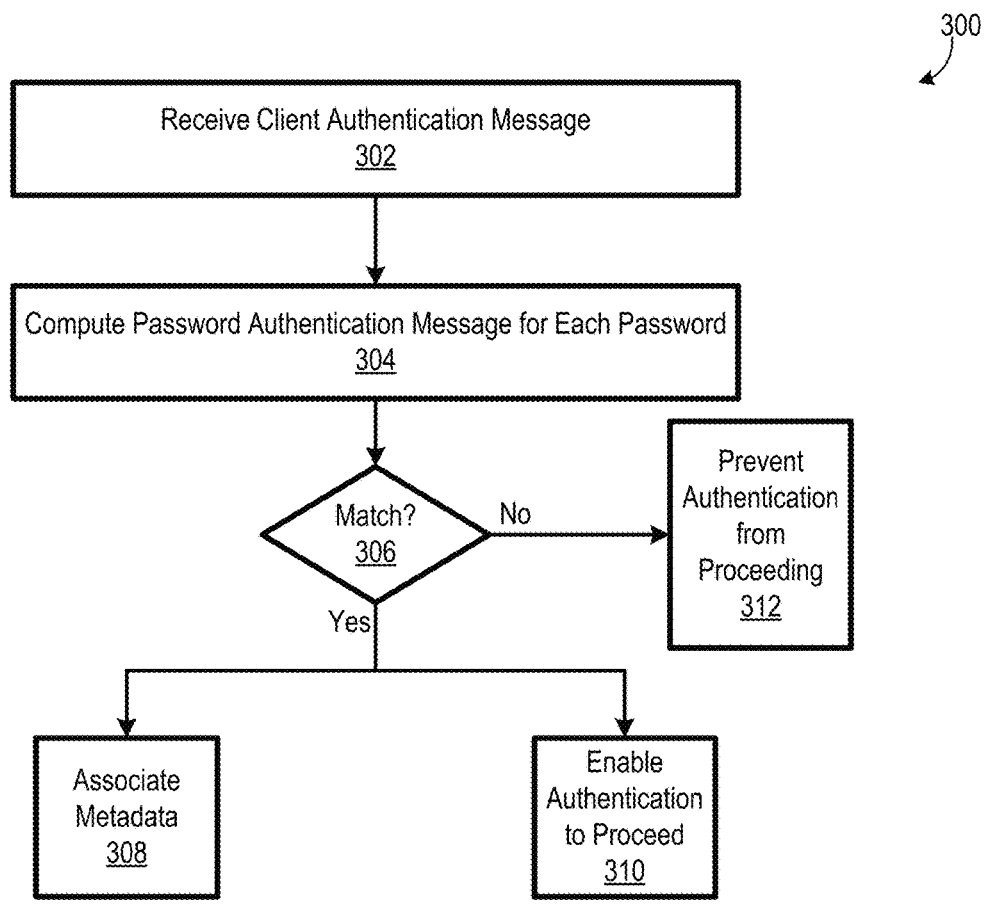
FIG. 3 is a flow chart of a method for supporting a plurality of passwords in a communication network, according to an embodiment.

FIG. 3 is a flow chart of a method 300 for supporting a plurality of passwords in a communication network, and method 300 is one example of operation of password support system 200. However, it is understood that password support system 200 is not limited to operating according to method 300.

In a block 302 of method 300, password engine 202 receives a client authentication message $CM_N$ generated by a network client, e.g., by one of network clients 106-120, which wishes to connect to wireless communication network 100. Password support system 200 may receive client authentication message $CM_N$ via wireless access point 104, such as part of a password authentication request from wireless access point 104. Client authentication message $CM_N$ includes a password presented to wireless communication network 100 by the network client wishing to connect to the network. For example, a client authentication message $CM_2$ generated by network client 108 would include password $PASS_2$ that is associated with this network client. While a password included in a client authentication message $CM_N$ could be expressed in plaintext, it is anticipated that the password will typically be expressed as ciphertext, such as a hash of the plaintext password. For example, a client authentication message $CM_2$ generated by network client 108 may include a hash of password $PASS_2$.

Figure 4:
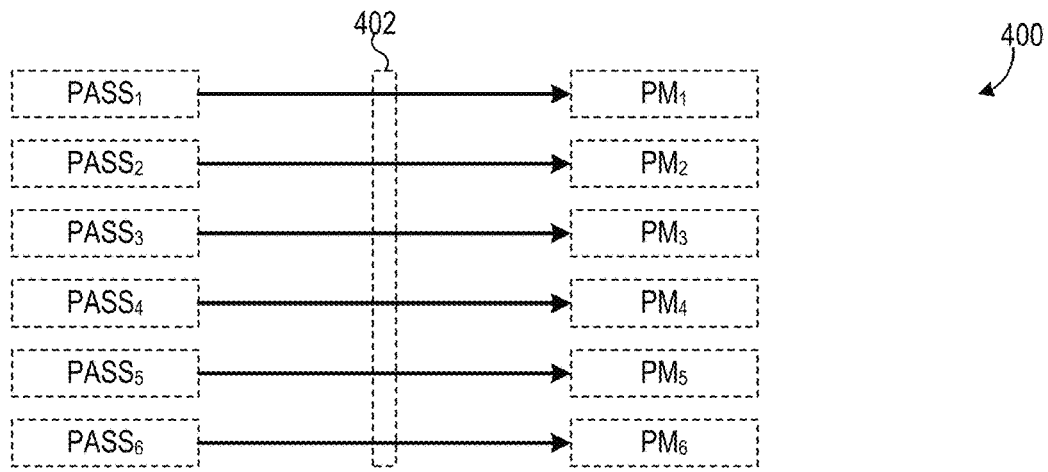
FIG. 4 is a block diagram illustrating an example of computing password authentication messages from passwords stored in a password database, according to an embodiment.

In a block 304 of method 300, password engine 202 sends a message 208 to password database 206, which causes password database 206 to compute a respective password authentication message $PM_N$ for each password stored in password database 206 and send the password authentication messages to password engine 202. FIG. 4 is a block diagram 400 illustrating an example of password database 206 computing password authentication messages $PM_N$ from passwords $PASS_N$ stored in password database 206. As shown in FIG. 4, password database 206 computes a password authentication message $PM_1$ from password $PASS_1$, password database 206 computes a password authentication message $PM_2$ from password $PASS_2$, and so on. Arrows 402 in FIG. 4 represent computing performed by password database 206. Password database 206 computes password authentication messages $PM_N$ such that a password authentication message $PM_N$ for a given password matches a client authentication message $CM_N$ generated by a network client associated with the same password. In particular, password authentication message $PM_1$ matches a client authentication message $CM_1$ generated by network client 106, password authentication message $PM_2$ matches a client authentication message $CM_2$ generated by network client 108, password authentication message $PM_3$ matches a client authentication message $CM_3$ generated by network client 110, and so on. In some embodiments, password database 206 is configured to compute password authentication messages $PM_N$ at least partially by generating hashes of respective passwords $PASS_N$.

In a decision block 306 of method 300, password engine 202 provides client authentication message $CM_N$ and each password authentication message $PM_1$-$PM_6$ to password checker 204, and password checker 204 determines whether any of the password authentication messages $PM_1$-$PM_6$ match client authentication message $CM_N$. For example, if client authentication message $CM_N$ is a client authentication message $CM_4$ generated by network client 112, password checker 204 determines that password authentication message $PM_4$ matches client authentication message $CM_4$. As another example, if client authentication message $CM_N$ is generated based on a password that is not stored in password database 206, password checker 204 determines that no password authentication message $PM_N$ matches client authentication message $CM_N$. If the result of decision block 306 is yes, method 300 proceeds to blocks 308 and 310, and if the result of decision block 306 is no, method 300 proceeds to a block 312. Password checker 204 provides the results of decision block 306, i.e., whether a password authentication message $PM_N$ matches client authentication message $CM_N$, to password engine 202 via a match index message 210.

Blocks 308 and 310 of method 300 are executed concurrently. In block 308, password support system 200 associates with the network client metadata corresponding to a password $PASS_N$ used to compute the password authentication message $PM_N$ that matches the client authentication message $CM_N$. As one example of block 308, assume that (a) network client 110 provides client authentication message $CM_3$ to password support system 200 via wireless access point 104 and (b) password support system 200 determines that password authentication message $PM_3$ matches client authentication message $CM_3$. In this example, password support system 200 associates metadata $MD_3$ with network client 110. As another example of block 308, assume that (a) network client 116 provides client authentication message $CM_5$ to password support system 200 via wireless access point 104 and (b) password support system 200 determines that password authentication message $PM_5$ matches client authentication message $CM_5$. In this example, password support system 200 associates metadata $MD_5$ with network client 116. Password support system 200 associates metadata $PM_N$ with a particular network client, for example, by sending the metadata to wireless access point 104 in conjunction with a message 212 advising that message was successful.

In block 310, password support system 200 enables authentication of the network client to proceed by sending message 212 to wireless access point 104 advising that the password match of decision block 306 succeeded. Wireless access point 104 may send an access point authentication message to the network client in response to receiving message 212. In block 312, in contrast, password support system 200 prevents authentication of the network client from proceeding by sending a message 214 to wireless access point 104 advising that the password match of decision block 306 failed.

Figure 5:
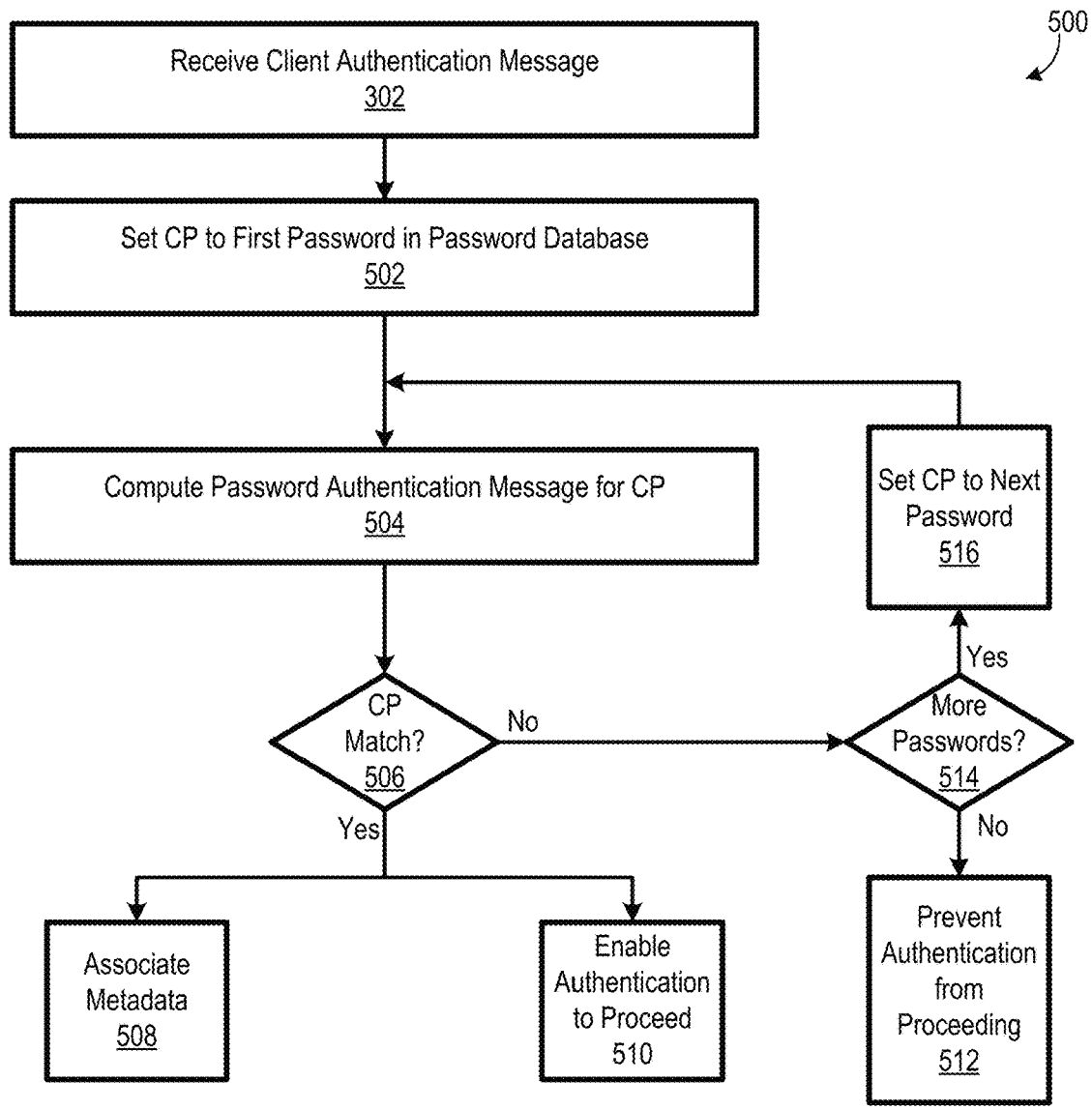
FIG. 5 is a flow chart of an alternate embodiment of the FIG. 3 method.

Method 300 could be modified so that password support system 200 computes one password authentication message $PM_N$ at a time and compares it to the received client authentication message $CM_N$. For example, FIG. 5 is a flow chart of a method 500, which is an alternate embodiment of method 300 of FIG. 3 where password support system 200 computes one password authentication message $PM_N$ at a time. Method 500 begins with block 302, which is executed in the same manner as discussed above with respect to FIG. 3. Method 500 proceeds from block 302 to a block 502 where password database 206 sets a current password variable (CP) to a first password stored in password database 206. In one example of block 502, password database sets 206 variable CP to password $PASS_1$. In a block 504 of method 500, password database 206 computes a password authentication message $PM_N$ for the password corresponding to variable CP. In one example of block 504, password database 206 computes password authentication message $PM_1$ for password $PASS_1$ corresponding to variable CP.

In a decision block 506, password checker 204 determines whether the password authentication messages $PM_N$ computed in block 504 matches the client authentication message $CM_N$ received in block 302. In one example of decision block 506, password checker 204 determines whether password authentication message $PM_1$ computed in the above example of block 504 matches the client authentication message $CM_N$ received in block 302. If the result of decision block 506 is yes, method 500 proceeds to blocks 508 and 510, and if the result of decision block 506 is no, method 500 proceeds to a decision block 514. Blocks 508 and 510 are the same as blocks 308 and 310 of FIG. 3, respectively, except that the matched password in blocks 508 and 510 is the password that matched in decision block 506, instead of the password that matched in decision block 306 of FIG. 3.

In decision block 514 of method 500, password database 206 determines whether there are any passwords in password database 206 that have not yet been checked to see if they correspond to the client authentication message $CM_N$ received in block 302. In one example of decision block 514, password database 206 determines that the result of decision block 514 is yes because passwords $PASS_2$ through $PASS_6$ have not yet been checked to see if they correspond to the client authentication message $CM_N$ received in block 302. If the result of decision block 514 is no, method 500 proceeds to a block 512, which is the same as block 312 of FIG. 3 except that message 214 advises that the client authentication message $CM_N$ received in block 302 does not correspond to a password stored in password database 206. If the result of decision block 512 is yes, method 500 proceeds to a block 516, where variable CP is set to the next password stored in password database 206. In one example of block 516, password database 206 sets variable CP to password $PASS_2$. Method 500 returns from block 516 to block 504 where password database 206 computes a password authentication message $PM_N$ for the current password corresponding to variable CP.

Figure 6:
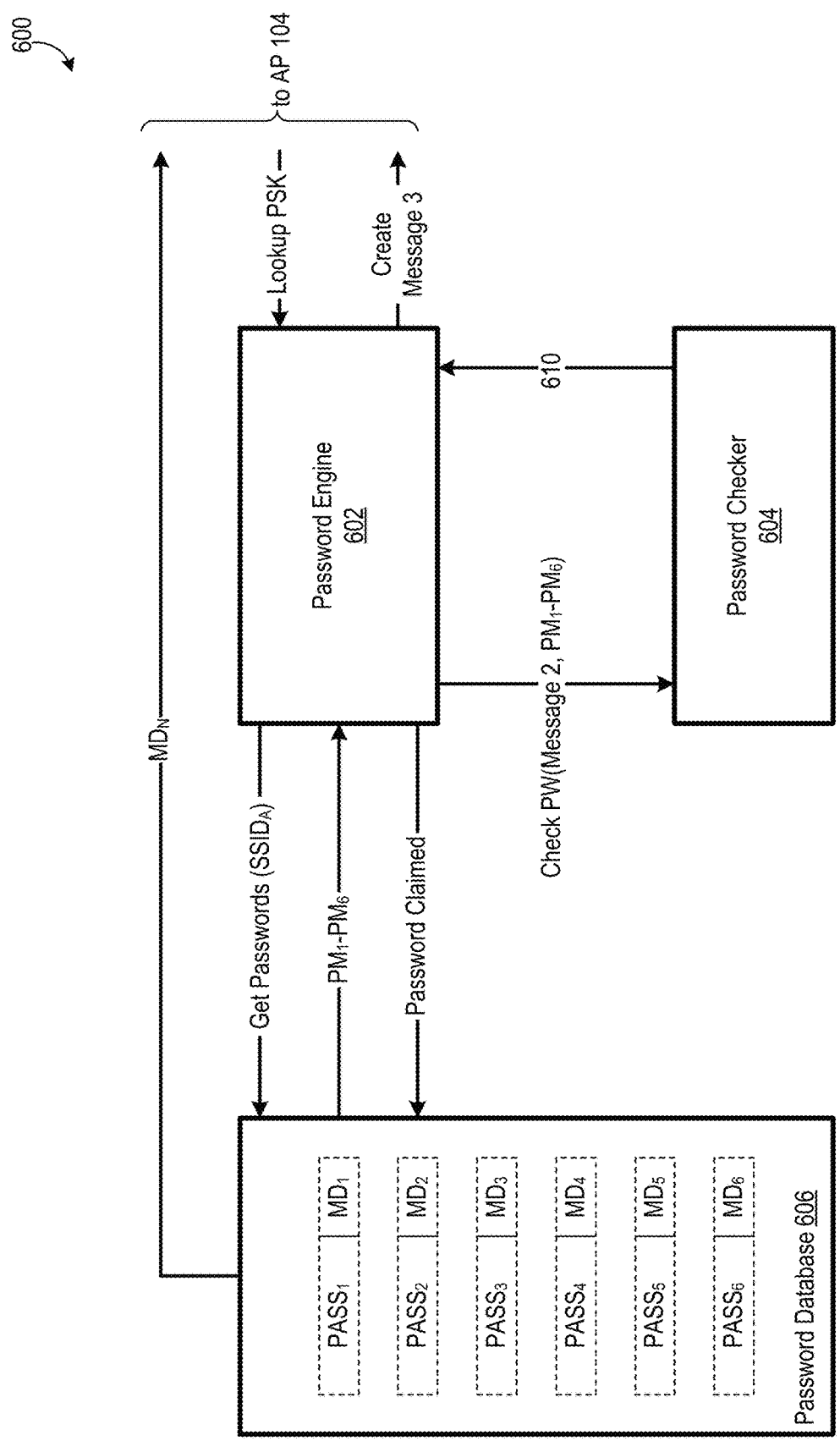
FIG. 6 is a block diagram of an embodiment of the FIG. 2 password support system that is configured to support authentication of a network client during an Extensible Authentication Protocol over Local Area Network (EAPOL) handshake process.

Some embodiments of wireless communication system 100 are configured to use a WPA2 security protocol. Accordingly, password support system 200 can be configured for use with the WPA2 security protocol, such as for use with an Extensible Authentication Protocol over Local Area Network (EAPOL) handshake process. For example, FIG. 6 is a block diagram of a password support system 600, which is an embodiment of password support system 200 of FIG. 2 that is configured to support authentication of a network client during a EAPOL handshake process. Password support system 600 includes a password engine 602, a password checker 604, and a password database 606, which are embodiments of password engine 202, password checker 204, and password database 206, respectively. Password support system 600 is configured to authenticate a password that is included in a EAPOL Message 2 sent from a network client to wireless access point 104.

Figure 7:
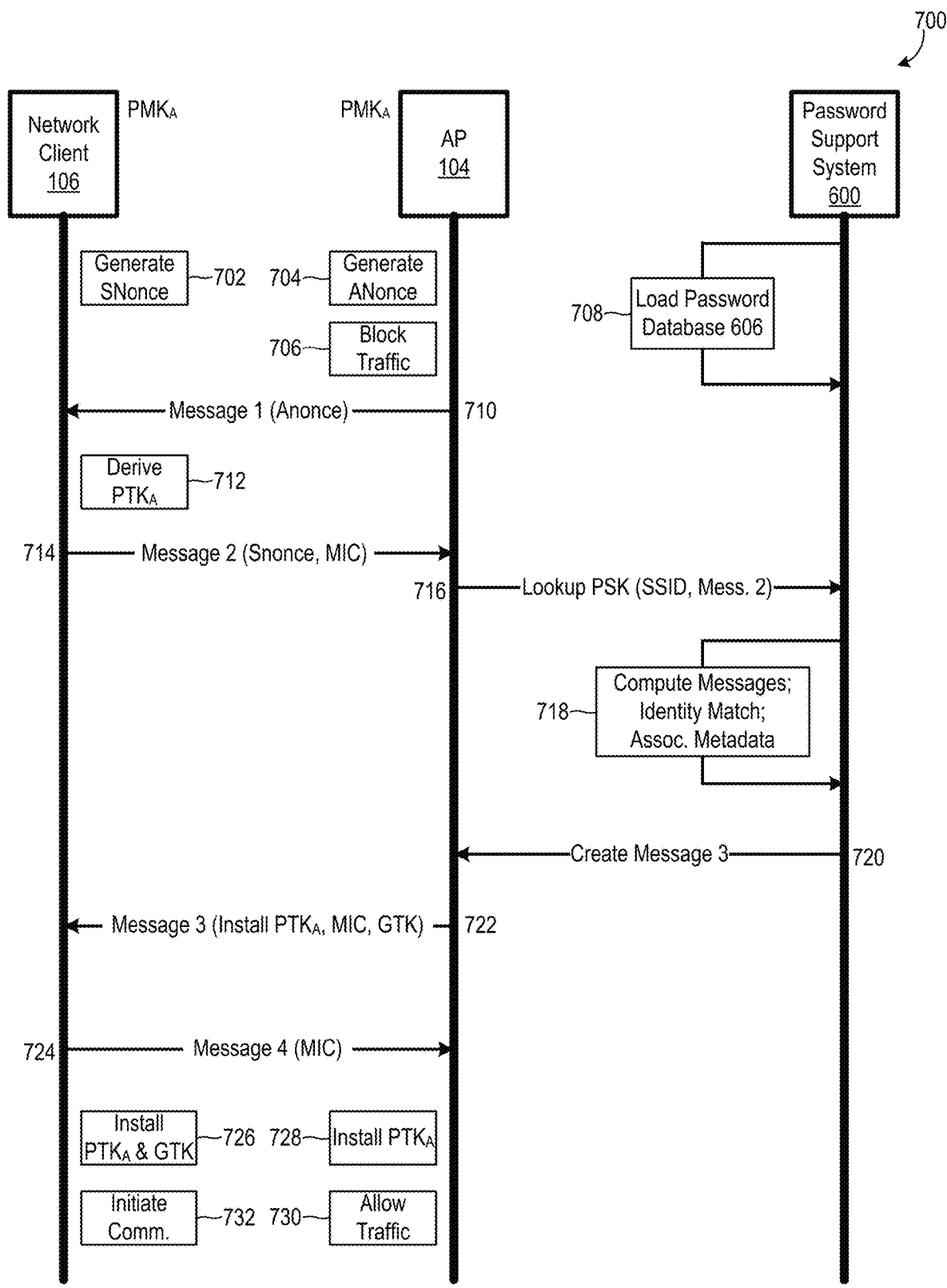
FIG. 7 is a dataflow diagram illustrating an example of operation of the FIG. 6 password support system.

FIG. 7 is a dataflow diagram illustrating an example of operation of password support system 600 in response to network client 106 beginning to associate with wireless access point 104. Network client 106 generates a Wi-Fi Station Nonce (SNonce) in a block 702. The SNonce is a random sequence partially based on a Pairwise Master Key ($PMK_A$) known to both of network client 106 and wireless access point 104. Similarly, wireless access point 104 generates an Access Point Nonce (ANonce) in block 704, where the ANonce is partially based on $PMK_A$. Additionally, wireless access point 104 blocks traffic on a controlled port for transmitting information between wireless access point 104 and network client 106. In a block 708, password support system 600 loads password database 606 with valid passwords $PASS_N$ of wireless communication network 100, as well as with metadata $MD_N$ corresponding to the valid passwords.

In a block 710, wireless access point 104 sends the ANonce to network client 106 via a unicast EAPOL Message 1. In response thereto, network client 106 generates a Pairwise Transient Key ($PTK_A$) at least partially based on $PMK_A$, the ANonce, and the SNonce, in a block 712. In a block 714, network client 106 generates and sends a unicast EAPOL Message 2 to wireless access point 104. The EAPOL Message 2 is an embodiment of client authentication message $CM_N$ of FIGS. 2 and 3, and the EAPOL Message 2 includes the SNonce and a message integrity check (MIC). In response to receiving the EAPOL Message 2, wireless access point 104 sends a lookup PSK message to password support system 600, in a block 716. The lookup PSK message includes the EAPOL Message 2 as well as $SSID_A$ associated with wireless communication network 100. The lookup PSK message optionally further includes additional metadata (not shown) associated with wireless access point 104.

In a block 718, password support system 600 performs several actions. First, password engine 602 sends a Get Passwords command to Password Database 606, as illustrated in FIG. 6, where the Get Passwords command is an embodiment of message 208 of FIG. 2. In response thereto, password database 606 computes a password authentication message for each password stored in password database 606, i.e., password database 606 computes password authentication messages $PM_N$-$PM_6$ corresponding to passwords $PASS_1$-$PASS_6$, respectively, and password database 606 sends the password authentication messages to password engine 602. Password engine 602 subsequently sends a Check PW command to password checker 604, where the Check PW command includes password authentication messages $PM_N$-$PM_6$ and the EAPOL Message 2. Password checker 604 next identifies password authentication message $PM_1$ as matching EAPOL Message 2 received via the lookup PSK message, and password checker 604 advises password engine 602 of the match via a match index 610 message. In response receipt of match index message 610, password engine 602 sends a Password Claimed message to password database 606, advising that password $PASS_1$ has been claimed. Furthermore, password support system 600 associates metadata $MD_1$, which corresponds with password $PASS_1$, with network client 106. In an alternate embodiment, password support system 600 computes one password authentication message $PM_N$ at a time and compares it to the EAPOL Message 2 received via the lookup PSK message, in a method analogous to that of method 500 of FIG. 5.

Referring again to FIG. 7, in a block 720, password support system 600 sends a Create Message 3 command to wireless access point 104, where the Create Message 3 command is an embodiment of message 212 of FIG. 1. The Create Message 3 command instructs wireless access point 104 to proceed with authentication of network client 106 by creating a EAPOL Message 3 based on the EAPOL message 2, and the Create Message 3 command is accompanied by metadata associated with the authenticated password, i.e., $MD_1$ associated with authenticated password $PASS_1$ in the FIG. 7 example.

In response to receiving the Create Message 3 command, wireless access point 104 generates a unicast EAPOL Message 3, and wireless access point 104 sends the EAPOL Message 3 to network client 106, in a block 722. The EAPOL Message 3 is an embodiment of the access point authentication message discussed above with respect to FIG. 3, and the EAPOL Message 3 includes an Install $PTK_A$ command, a MIC, and a Group Temporal Key (GTK). Network client 106 next sends a unicast EAPOL Message 4 including a MIC to wireless access point 104, in a block 724. In a block 726, network client 106 installs the $PTK_A$ and the GTK, and in a block 728, wireless access point 104 installs the $PTK_A$. In a block 730, wireless access point 104 enables traffic on the controlled port, and network client 106 initiates communication with wireless access point 104 in a block 732.

It should be appreciated that use of password support system 600 during an EAPOL handshake process advantageously does not require proprietary network clients. Consequently, password support system 600 can be used with conventional network clients using the WPA2 security protocol. Additionally, password support system 600 could be modified to operate with a Wi-Fi security protocol other than WPA2, or to operate with a Wi-Fi security protocol in addition to WPA2, without departing from the scope hereof. For example, password support system 600 could be modified to operate with the Wi-Fi Protected Access III (WPA3) security protocol.

Combinations of Features

Features described above may be combined in various ways without departing from the scope hereof. The following examples illustrate some possible combinations.

(A1) A method for supporting a plurality of passwords in a communication network includes (1) receiving a client authentication message generated by a network client wishing to connect to the communication network, (2) computing a respective password authentication message for at least one password of a plurality of passwords stored in a password database to generate a set of one or more password authentication messages, each password of the plurality of passwords being a password for the communication network, (3) identifying a password authentication message of the set of one or more password authentication messages that matches the client authentication message, and (4) associating, with the network client, metadata corresponding to a password of the password database used to compute the password authentication message that matches the client authentication message.

(A2) In the method denoted as (A1), the client authentication message may be a message of an Extensible Authentication Protocol over Local Area Network (EAPOL) handshake process.

(A3) In the method denoted as (A2), the client authentication message may include a Message 2 of the EAPOL handshake process.

(A4) In any one of the methods denoted as (A1) through (A3), the client authentication message may include a random sequence of the network client.

(A5) In the method denoted as (A4), the random sequence of the network client may be a Wi-Fi Station Nonce (SNonce).

(A6) In any one of the methods denoted as (A1) through (A5), at least two passwords of the plurality of passwords stored in the password database may be associated with different respective users of the communication network.

(A7) In any one of the methods denoted as (A1) through (A6), at least two passwords of the plurality of passwords stored in the password database may be associated with different respective devices that may be used in the communication network.

(A8) In any one of the methods denoted as (A1) through (A7), at least two passwords of the plurality of passwords stored in the password database may be associated with different respective policies of the communication network.

(A9) In any one of the methods denoted as (A1) through (A8), the network client may include a device selected from the group consisting of a Wi-Fi station, a Wi-Fi wireless extender, and a Wi-Fi wireless access point.

(A10) In any one of the methods denoted as (A1) through (A9), the method may be at least partially performed by a Wi-Fi access point.

(A11) Any one of the methods denoted as (A1) through (A10) may further include after identifying the password authentication message of the set of one or more password authentication messages that matches the client authentication message, creating an access point authentication message at least partially based on the client authentication message.

(A12) The method denoted as (A11) may further include sending the access point authentication message to the network client.

(A13) In any one of the methods denoted as (A11) and (A12), the access point authentication message may be a message of an Extensible Authentication Protocol over Local Area Network (EAPOL) handshake process.

(A14) In the message denoted as (A13), the access point authentication message may be a Message 3 of the EAPOL handshake process.

(B1) A method for supporting a plurality of passwords in a communication network includes (1) receiving a client authentication message generated by a network client wishing to connect to the communication network, (2) computing a respective password authentication message for at least one password of a plurality of passwords stored in a password database to generate a set of one or more password authentication messages, each password of the plurality of passwords being a password for the communication network, (3) identifying a password authentication message of the set of one or more password authentication messages that matches the client authentication message, and (4) in response to identifying the password authentication message that matches the client authentication message, enabling authentication of the network client.

(B2) In the method denoted as (B1), enabling authentication of the network client may include generating an access point authentication message.

(B3) In the method denoted as (B2), the access point authentication message may be a message of an Extensible Authentication Protocol over Local Area Network (EAPOL) handshake process.

(B4) In any one of the methods denoted as (B1) through (B3), the client authentication message may be a message of an Extensible Authentication Protocol over Local Area Network (EAPOL) handshake process.

(B5) In any one of the methods denoted as (B1) through (B4), the client authentication message may include a Wi-Fi Station Nonce (SNonce).

(C1) A method for supporting a plurality of passwords in a communication network using an Extensible Authentication Protocol over Local Area Network (EAPOL) handshake process includes (1) computing a respective password authentication message for at least one password of a plurality of passwords stored in a password database to generate a set of one or more password authentication messages, each password of the plurality of passwords being a password for the communication network, and (2) identifying a password authentication message of the set of one or more password authentication messages that matches a Message 2 of the EAPOL handshake process.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for supporting a plurality of passwords in a communication network, comprising:
   receiving a client authentication message generated by a network client wishing to connect to the communication network;
   computing a respective password authentication message for at least one password of a plurality of passwords stored in a password database to generate a set of one or more password authentication messages, each password of the plurality of passwords being a password for the communication network;
   identifying a password authentication message of the set of one or more password authentication messages that matches the client authentication message;
   associating, with the network client, metadata corresponding to a password of the password database used to compute the password authentication message that matches the client authentication message; and
   at least partially based on the metadata, controlling operation of at least one wireless access point to provide a customized communication operating experience for the network client.

2. The method of claim 1, wherein the client authentication message is a message of an Extensible Authentication Protocol over Local Area Network (EAPOL) handshake process.

3. The method of claim 2, wherein the client authentication message includes a Message 2 of the EAPOL handshake process.

4. The method of claim 1, wherein the client authentication message includes a random sequence of the network client.

5. The method of claim 4, wherein the random sequence of the network client is a Wi-Fi Station Nonce (SNonce).

6. The method of claim 1, wherein at least two passwords of the plurality of passwords stored in the password database are associated with different respective users of the communication network.

7. The method of claim 1, wherein at least two passwords of the plurality of passwords stored in the password database are associated with different respective devices that may be used in the communication network.

8. The method of claim 1, wherein at least two passwords of the plurality of passwords stored in the password database are associated with different respective policies of the communication network.

9. The method of claim 1, wherein the network client comprises a device selected from the group consisting of a Wi-Fi station, a Wi-Fi wireless extender, and a Wi-Fi wireless access point.

10. The method of claim 1, wherein the method is at least partially performed by a Wi-Fi access point.

11. The method of claim 1, further comprising, after identifying the password authentication message of the set of one or more password authentication messages that matches the client authentication message, creating an access point authentication message at least partially based on the client authentication message.

12. The method of claim 11, further comprising sending the access point authentication message to the network client.

13. The method of claim 12, wherein the access point authentication message is a message of an Extensible Authentication Protocol over Local Area Network (EAPOL) handshake process.

14. The method of claim 13, wherein the access point authentication message is a Message 3 of the EAPOL handshake process.

15. A method for supporting a plurality of passwords in a communication network, comprising:
    receiving a client authentication message generated by a network client wishing to connect to the communication network;
    computing a respective password authentication message for at least one password of a plurality of passwords stored in a password database to generate a set of one or more password authentication messages, each password of the plurality of passwords being a password for the communication network;
    identifying a password authentication message of the set of one or more password authentication messages that matches the client authentication message; and
    in response to identifying the password authentication message that matches the client authentication message, enabling authentication of the network client.

16. The method of claim 15, wherein enabling authentication of the network client comprises generating an access point authentication message.

17. The method of claim 16, wherein the access point authentication message is a message of an Extensible Authentication Protocol over Local Area Network (EAPOL) handshake process.

18. The method of claim 15, wherein the client authentication message is a message of an Extensible Authentication Protocol over Local Area Network (EAPOL) handshake process.

19. The method of claim 15, wherein the client authentication message includes a Wi-Fi Station Nonce (SNonce).

20. A method for supporting a plurality of passwords in a communication network using an Extensible Authentication Protocol over Local Area Network (EAPOL) handshake process, comprising:
    computing a respective password authentication message for at least one password of a plurality of passwords stored in a password database to generate a set of one or more password authentication messages, each password of the plurality of passwords being a password for the communication network;
    identifying a password authentication message of the set of one or more password authentication messages that matches a Message 2 of the EAPOL handshake process; and
    in response to identifying the password authentication message that matches the Message 2 of the EAPOL handshake process, enabling authentication of a network client.

* * * * *